United States Patent Office 2,992,122
Patented July 11, 1961

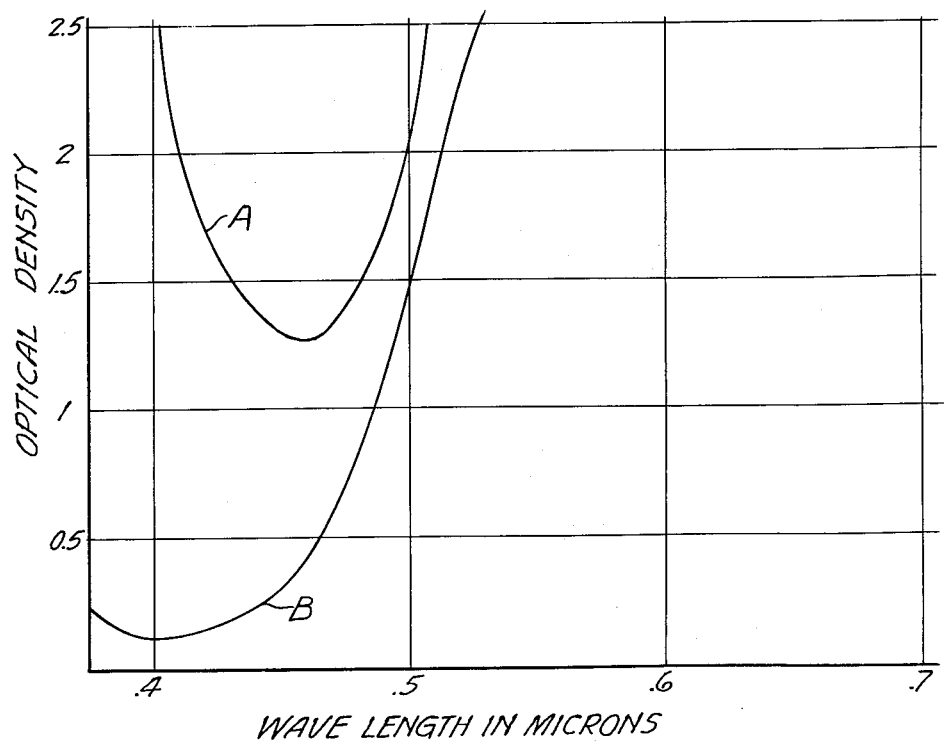

2,992,122
LIGHT FILTERING HIGH-INDEX GLASS ELEMENTS
Warren R. Beck, Mahtomedi, and Chi Fang Tung, Lincoln Township, Washington County, Minn., assignors to Minnesota Mining and Manufacturing Company, St. Paul, Minn., a corporation of Delaware
Filed Feb. 16, 1959, Ser. No. 793,411
5 Claims. (Cl. 106—53)

This invention relates to our discovery of transparent blue glass elements of high refractive index exhibiting a narrower range of transmission of blue light than hitherto known even in conventional low index glasses.

We have succeeded in making novel and useful glass elements transmitting visible light limited almost entirely to the 0.40 to .52 micron region. Our glass elements have a high refractive index (about 1.9 for indigo blue light). They have a peak in light transmission at or near .46 micron. They are stable to severe weathering conditions.

Glass elements of this invention, particularly in bead form, are useful in a variety of reflex-reflecting applications, e.g., in highway marking paints, in reflex-reflecting elements composed of glass beads with associated hemispherical reflective coatings, in reflex-reflecting sheet articles, etc. They are particularly useful in the fabrication of retroreflective screens for use in a telecasting technique such as described in copending applications of Robert C. Vanstrum, Serial No. 791,164, filed February 4, 1959, and now abandoned, and of Eugene L. McKenzie and Melvin L. Johnson, Serial No. 791,165, filed February 4, 1959, and now abandoned. In such telecasting uses, it is necessary, for maximum success of the telecasting technique, that the glass beads of a lenticular-surfaced reflex-reflecting screen transmit light of only a limited band of wave lengths. The properties of our elements make them especially desirable for such uses, since they transmit only a desired spectral range of blue light, and yet exhibit the required indices of refraction for maximum brilliance of reflex-reflection by the screen.

While blue glass filters have been available heretofore, they have been of low refractive index and have not been capable of limiting blue light transmission to only the narrower wave range of wave lengths known commonly as the indigo blue range (e.g., .40–.52 micron). As an illustration, a well-recognized commercially-available blue glass filter is transmissive to light all the way from about .52 micron down to .35 micron or lower, exhibiting a relatively wide band of high transmission without any sharp peak. It may be observed that the human eye is appreciably sensitive from about .37 micron to .72 micron, as shown in Strong's "Concepts of Classical Optics," W. H. Freeman and Company, San Francisco, 1958, page 490. Thus the wide band of light transmitted by the commercially available filter aforementioned is readily distinguishable by an observer from the limited region of light waves transmitted by our glass elements. Of course, such broader transmission characteristic may not be disadvantageous in the usual optical system for visual observation; however, it considerably hampers and limits the success of telecasting using such technique as described in the aforereferenced copending applications. The band of light transmitted by the glass beads of the screen employed in such telecasting technique is used to control the printing or telecasting of an image from a separate satellite camera, and is excluded from the picture telecast from the main camera before the screen in question. The exclusion of a large band of light from the picture telecast from the main camera would considerably hamper the success of the telecasting process. It is, therefore, of critical importance that a limited band of wave lengths alone be transmitted by the glass elements employed in the screen used in the telecasting technique. Our elements are especially effective and permit particularly efficient operation of this telecasting technique.

The composition of our glass elements is of such a nature that it cannot be employed in making optical glass elements of the usual sizes such as required for telescopes, cameras and similar optical instruments. Our compositions in fluid form have a strong devitrification tendency and crystallize if cooled too slowly. We have found, however, that if the thickness of elements does not exceed about 2 millimeters, sufficiently rapid cooling of the hot glass is possible so that a transparent non-devitrified product results.

Examples of glass elements that may be formed using the principles of this invention are beads, fibers, flakes, thin plates such as for capacitor use, "gem" stones, etc. Preferred thicknesses for the elements of this invention generally will not exceed about 0.2 millimeter since much greater thicknesses tend to absorb too high a percentage of incident light for light transmission to be visually apparent to the casual observer. Where light transmission sensitivity is detected by an electronic means, however, much greater thicknesses are permissible. Nevertheless, for maximum brilliancy of retrodirective reflection, as in the reflex-reflecting screens employed in the telecasting technique aforenoted, it is of importance to employ elements of as small size as possible, e.g., even beads or microspheres as small as about 15 to 20 microns in diameter. In general, however, we have found that glass beads no larger than about 10 mils in diameter offer the most advantageous combination of optical properties for brilliance of light return as well as the desired filtering properties.

The invention will now be described in reference to a drawing, made a part hereof, consisting of a graph containing two curves. Curve "A" is characteristic of glass beads having the composition set forth in Example 16 below, and is illustrative of the curves of light transmission for all the glasses hereof. Curve "B" is placed in the graph for comparison purposes to illustrate the curve of light transmission and absorption obtained with a conventional commercially available cobalt containing filter glass. The area below each curve is indicative of the light waves absorbed.

The glass elements of this invention, which are composed of glass having a refractive index of about 1.9, varying in the range of about 1.8 to 2.0, contain a signicant amount of both cobalt oxide and titanium dioxide as network forming oxides. Although we do not wish to be bound by theory, the cobalt oxide and titanium dioxide both appear to assume a tetrahedral structure, i.e., $CoO_4^{-6}$, $TiO_4^{-4}$, and become network formers in our glasses. Furthermore, they appear to be the primary contributing factors in causing our glasses to exhibit a limited transmission characteristic in the indigo blue range, causing a peak of light transmission at approximately .46 micron.

The composition of our glasses is characterized in the following table, wherein amounts are set forth in percent by weight:

Table A

| | |
|---|---|
| SoO | 1–10 |
| $TiO_2$ | 20–50 |
| BaO | 0–40 |
| PbO | 0–50 |
| BaO+PbO | 20–60 |
| $SiO_2$ | 5–25 |
| $B_2O_3$ | 0–15 |
| $SiO_2+B_2O_3$ | 10–30 |
| $R_2O$ (alkali metal oxides) | 0–15 |

At least approximately 90% of the weight of our glass is made up from ingredients and amounts satisfying the requirements of the foregoing table. If desired for reasons of meltability, cost, or minor adjustment of properties, other recognized substitutes for glassforming charges may be included to form a part of the composition, e.g., other alkaline earth oxides or zinc oxide, cadmium oxide, germanium oxide, etc.

It will be appreciated that by varying the composition of the glass slightly, shifts in the peak of light transmission by the glass may be effected, within the range of .44 to .48 micron. For example, as the titanium dioxide content is increased while other ingredients of the composition remain in the same relative proportions with respect to each other, the peak of light transmission tends to shift upwardly.

While our glasses are reported in terms of oxide composition, in accordance with the general custom, it will be recognized that either the oxides as such or compounds other than the listed oxides may be added to the original glassmaking charge in amounts calculated to provide the desired amount of oxide. For example, boric acid, $Co_3O_4$, barium carbonate, $Pb_3O_4$, sodium carbonate, etc., may be used. Small amounts of fluoride may also be added to promote fluidity.

In preparing our glasses we find that best results are obtained if the melting of a raw batch is done in a non-porous corrosion-resistant crucible. Good results can be obtained at reasonable crucible cost by using unglazed Coors porcelain crucibles, marketed by Coors Porcelain Company of Denver, Colorado. Impervious crucibles of more refractory substances as alumina or platinum crucibles give best results but are generally expensive to employ.

The glassmaking charges are usually melted to a temperature of approximately 1200° C. to 1500° C., preferably about 1300° C., at which temperature they become extremely fluid and free flowing. Once melted, the charge may quickly be quenched by pouring it in a bath of relatively cold water (water at approximately room temperature). The fluid glass striking the cold water is shattered into a plurality of small particles, i.e., glass cullet. Beads may be formed from these small particles of glass cullet by dropping the particles through a high temperature flame or radiant heating zone to soften them sufficiently so that surface tension forces cause the molten particles of glass to assume a spherical shape while they are free falling. They should be allowed to fall through the heating zone directly into a current of cool air (e.g., air at normal room temperature is suitable). Rapid cooling of the spherical shapes caused by their fall through the cool air hardens them without devitrification taking place. Beads formed in this manner may then be screened to size for use in forming reflex-reflecting structures as referred to hereinabove. Other elements of the invention may be made using adaptations of existing techniques. For example, fibers may be formed by jet blowing a stream of molten glass in cool air. Filaments can be drawn from molten glass through a die, following by rapid cooling. Thin plates and flakes may be made by casting a thin layer of molten glass on a cool surface (e.g., room temperature steel surface). Jewelry "gems" may be made by polishing cullet or the like, by pressing, etc.

The composition of our preferred high index indigo blue filter elements, i.e., those with the most suitable combinations of refractive index, color, sharpness of peak of light transmission, durability and fusibility (i.e., ease of forming into beads) are characterized by the following table, wherein amounts are set forth in weight percent:

*Table B*

| | |
|---|---|
| CoO | 2–8 |
| $ToO_2$ | 30–40 |
| BaO | 25–40 |
| PbO | 0–25 |
| BaO+PbO | 25–50 |
| $SiO_2$ | 10–20 |
| $B_2O_3$ | 0–5 |
| $SiO_2+B_2O_3$ | 10–20 |
| $R_2O$ (alkali metal oxides) | 6–12 |

It should be observed that we employ a generally high content of cobalt oxide in our small glass elements. We have found that small glass beads having a diameter of about 25 microns should contain approximately 7% cobalt oxide in their glass composition in order for them to exhibit optimum properties of light transmission and absorption, as desired. Larger elements, e.g., beads of approximately 75 microns diameter, exhibit the desired properties with approximately 2% by weight cobalt oxide, although larger amounts still give good results.

The invention is illustrated by the examples set forth in the following table showing exemplary glass compositions and the characteristics of each. All of the glass beads set forth in the table were absorptive of essentially all wave lengths of light outside of the range of .40 to .52 micron. Under "Peak" in the table is set forth the wave length in microns at which the glass example exhibited a peak or maximum of light transmission. Under "Size" in the table is set forth the average diameter of the glass beads in mils. While the beads of each example varied from the listed average diameter, the vast majority of them were within about 30% of the diameter listed. (Glass elements as thick as 2 mm. have been prepared from compositions of these examples.) Under "Rrefractive Index" in the table is set for the refraction of blue light caused by the glass elements of each example.

*Table C*

| Ex. No. | Size | CoO | $TiO_2$ | BaO | $SiO_2$ | $B_2O_3$ | $Na_2O$ | Other Ingredients | Refractive Index (Blue) | Peak |
|---|---|---|---|---|---|---|---|---|---|---|
| 1 | 9 | 1.20 | 29.56 | 22.82 | 16.39 | 4.06 | 5.40 | $K_2O$, 0.76; PbO, 19.84 | 1.95 | 0.46+ |
| 2 | 9 | 1.02 | 37.77 | 31.76 | 15.50 | 3.32 | 9.08 | $K_2O$, 1.56 | 1.89 | 0.46+ |
| 3 | 3 | 2.49 | 37.20 | 31.28 | 15.27 | 3.27 | 8.95 | $K_2O$, 1.54 | 1.90 | 0.47 |
| 4 | 3 | 2.07 | 35.42 | 32.43 | 15.83 | 3.39 | 9.28 | $K_2O$, 1.59 | 1.89 | 0.465 |
| 5 | 1.5 | 9.09 | 39.55 | 26.64 | 13.00 | 2.82 | 7.63 | $K_2O$, 1.27 | 1.95 | 0.47– |
| 6 | 1.5 | 6.9 | 33.80 | 31.0 | 15.1 | 2.7 | 8.65 | $K_2O$, 1.5 | 1.91 | 0.46 |
| 7 | 3 | 3.0 | 45.0 | 27.0 | 22.0 | 4.0 | 4.0 | | 1.91 | 0.46+ |
| 8 | 3 | 2.3 | 42.0 | 24.8 | 21.2 | | 3.4 | $K_2O$, 6.6 | 1.92 | 0.465 |
| 9 | 3 | 4.0 | 35.0 | 26.5 | 25.0 | | 9.5 | | 1.87 | 0.455 |
| 10 | 3 | 2.5 | 21.0 | 25.0 | 16.0 | 4.0 | 6.0 | PbO, 25.5 | 1.91 | 0.45 |
| 11 | 3 | 2.0 | 35.0 | 38.0 | 18.0 | | 3.0 | $K_2O$, 4.0 | 1.90 | 0.46 |
| 12 | 1.5 | 4.0 | 36.0 | 29.6 | 10.0 | 3.2 | 4.0 | PbO, 12.7 | 2.00 | 0.47– |
| 13 | 1.5 | 5.0 | 39.0 | 25.0 | 11.0 | 5.0 | 10.0 | $K_2O$, 5.0 | 1.90 | 0.465– |
| 14 | 3 | 2.0 | 20.0 | | 12.0 | 5.0 | 8.0 | $K_2O$, 3.0; PbO, 50.0 | 1.95 | 0.46– |
| 15 | 3 | 2.0 | 40.0 | 6.0 | 12.0 | 10.0 | 3.0 | $K_2O$, 2.0; PbO, 25.0 | 1.97 | 0.475 |
| 16 | 3 | 2.24 | 35.52 | 32.6 | 15.9 | 2.84 | 9.08 | $K_2O$, 1.6 | 1.91 | 0.46 |

That which is claimed is:

1. Transparent indigo blue glass elements, resistant to weathering, having a thickness not exceeding 2 millimeters, and having a peak in visible light transmission between .40 and .52 micron, said elements being essentially absorptive of all visible wave lengths of light outside of said range, and being formed from a glass characterized by a significant amount of both CoO and $TiO_2$, and consisting essentially of a metal oxide combination satisfying the composition requirements of the following table wherein amounts are specified in weight percent:

| | |
|---|---|
| CoO | 1–10 |
| $TiO_2$ | 20–50 |
| BaO | 0–40 |
| PbO | 0–50 |
| BaO+PbO | 20–60 |
| $SiO_2$ | 5–25 |
| $B_2O_3$ | 0–15 |
| $SiO_2+B_2O_3$ | 10–30 |
| $R_2O$ (alkali metal oxides) | 0–15 |

2. Transparent glass beads having a diameter not exceeding 10 mils and satisfying the requirements of claim 1.

3. Transparent indigo blue glass elements, resistant to weathering, having a thickness not exceeding 2 millimeters, and having a peak in visible light transmission between .40 and .52 micron, said elements being essentially absorptive of all visible wave lengths of light outside of said range, and being formed from a glass characterized by a significant amount of both CoO and $TiO_2$ and consisting essentially of a metal oxide combination satisfying the composition requirements of the following table wherein amounts are specified in weight percent:

| | |
|---|---|
| CoO | 2–8 |
| $TiO_2$ | 30–40 |
| BaO | 25–40 |
| PbO | 0–25 |
| BaO+PbO | 25–50 |
| $SiO_2$ | 10–20 |
| $B_2O_3$ | 0–5 |
| $SiO_2+B_2O_3$ | 10–20 |
| $R_2O$ (alkali metal oxides) | 6–12 |

4. Transparent glass beads having a diameter not exceeding 10 mils and satisfying the requirements of claim 3.

5. As a new article of manufacture, transparent indigo blue glass elements, resistant to weathering, and having a peak of visible light transmission at about .46 micron wave length, and essentially all visible light transmission between .40 and .52 micron, said glass having the following approximate composition in weight percent: 3% CoO, 36% $TiO_2$, 30% BaO, 16% $SiO_2$, 3% $B_2O_3$, 9% $Na_2O$, and 2% $K_2O$.

References Cited in the file of this patent

UNITED STATES PATENTS

| 2,631,106 | Mitkewich | Mar. 10, 1953 |
| 2,720,473 | Donahey | Oct. 11, 1955 |

UNITED STATES PATENT OFFICE
CERTIFICATE OF CORRECTION

Patent No. 2,992,122                      July 11, 1961

Warren R. Beck et al.

It is hereby certified that error appears in the above numbered patent requiring correction and that the said Letters Patent should read as corrected below.

Column 2, Table A, left-hand column, line 1, for "SoO" read -- CoO --; column 3, line 24, for "fluoride" read -- flourine --; column 4, Table B, left-hand column, line 2, for "ToO$_2$" read -- TiO$_2$ --; lines 53 and 54, for "Rrefractive" read -- Refractive --.

Signed and sealed this 28th day of November 1961.

(SEAL)
Attest:

ERNEST W. SWIDER                      DAVID L. LADD
Attesting Officer                      Commissioner of Patents

USCOMM-DC